United States Patent
Bromberg et al.

(10) Patent No.: US 12,110,229 B2
(45) Date of Patent: Oct. 8, 2024

(54) PROCESS FOR RECOVERING HEAT AT HIGH TEMPERATURES IN PLASMA REFORMING SYSTEMS

(71) Applicant: MAAT Energy Company, Cambridge, MA (US)

(72) Inventors: Leslie Bromberg, Sharon, MA (US); Kim-Chinh Tran, Cambridge, MA (US); Jorj Ian Owen, Dulles, VA (US)

(73) Assignee: MAAT Energy Company, Cambridge, MA (US)

( * ) Notice: Subject to any disclaimer, the term of this patent is extended or adjusted under 35 U.S.C. 154(b) by 750 days.

(21) Appl. No.: 17/276,563

(22) PCT Filed: Sep. 26, 2019

(86) PCT No.: PCT/US2019/053177
§ 371 (c)(1),
(2) Date: Mar. 16, 2021

(87) PCT Pub. No.: WO2020/069146
PCT Pub. Date: Apr. 2, 2020

(65) Prior Publication Data
US 2022/0048003 A1    Feb. 17, 2022

Related U.S. Application Data

(60) Provisional application No. 62/737,420, filed on Sep. 27, 2018.

(51) Int. Cl.
*C01B 3/34* (2006.01)
*B01J 8/04* (2006.01)
(Continued)

(52) U.S. Cl.
CPC .............. *C01B 3/342* (2013.01); *B01J 8/04* (2013.01); *B01J 8/0492* (2013.01); *B01J 8/0496* (2013.01);
(Continued)

(58) Field of Classification Search
None
See application file for complete search history.

(56) References Cited

U.S. PATENT DOCUMENTS 2,846,296 A * 8/1958 Hasche .................. C10G 11/12
585/602
4,405,010 A * 9/1983 Schwartz ............ F28D 20/0056
165/4
(Continued)

FOREIGN PATENT DOCUMENTS

CN    107011946 A    8/2017
CN    108299146 A    7/2018
(Continued)

OTHER PUBLICATIONS

International Search Report and Written Opinion mailed Dec. 30, 2021 in corresponding PCT application No. PCT/ US2019/053177.
(Continued)

*Primary Examiner* — Jennifer A Leung
(74) *Attorney, Agent, or Firm* — NIELDS, LEMACK & FRAME, LLC

(57) ABSTRACT

A heat recovery system for plasma reformers is comprised of a cascade of regenerators and recuperators that are arranged to transfer in stages the heat at high temperatures for storage, transport, and recirculation. Recirculation of heat increases the efficiency of plasma reformers and heat exchanging reduces temperature of the product for downstream applications.

10 Claims, 11 Drawing Sheets

(51) Int. Cl.
  *C01B 3/40* (2006.01)
  *F28D 17/02* (2006.01)
  *F28D 17/04* (2006.01)
  *F28D 20/02* (2006.01)
  *F28D 21/00* (2006.01)

(52) U.S. Cl.
  CPC ............... *C01B 3/40* (2013.01); *F28D 17/02* (2013.01); *F28D 17/04* (2013.01); *F28D 20/023* (2013.01); *B01J 2208/00513* (2013.01); *B01J 2208/0053* (2013.01); *B01J 2208/00752* (2013.01); *C01B 2203/0238* (2013.01); *C01B 2203/0861* (2013.01); *C01B 2203/0866* (2013.01); *C01B 2203/0872* (2013.01); *C01B 2203/0883* (2013.01); *C01B 2203/1241* (2013.01); *C01B 2203/1614* (2013.01); *C01B 2203/1623* (2013.01); *F28D 2021/0022* (2013.01)

(56) References Cited

U.S. PATENT DOCUMENTS

| | | | |
|---|---|---|---|
| 4,421,661 A * | 12/1983 | Claar | C09K 5/063 428/404 |
| 4,505,953 A | 3/1985 | Chen et al. | |
| 4,918,049 A | 4/1990 | Cohn et al. | |
| 5,231,073 A | 7/1993 | Cohn et al. | |
| 5,939,831 A | 8/1999 | Fong et al. | |
| 6,113,874 A * | 9/2000 | Kobayashi | C01B 3/34 585/653 |
| 6,635,997 B2 | 10/2003 | Ikeda et al. | |
| 6,981,472 B2 | 1/2006 | Bromberg et al. | |
| 7,164,095 B2 | 1/2007 | Lee et al. | |
| 7,189,939 B2 | 3/2007 | Lee et al. | |
| 7,279,143 B2 | 10/2007 | Bromberg et al. | |
| 7,381,382 B2 | 6/2008 | Rabinovich et al. | |
| 7,407,634 B2 | 8/2008 | Rabinovich et al. | |
| 7,806,077 B2 | 10/2010 | Lee et al. | |
| 7,842,106 B2 | 11/2010 | Gonchar et al. | |
| 8,518,162 B2 | 8/2013 | Smith et al. | |
| 8,633,648 B2 | 1/2014 | Tanibata et al. | |
| 8,776,719 B2 | 7/2014 | Radoiu et al. | |
| 9,574,086 B2 | 2/2017 | Johnson et al. | |
| 10,100,200 B2 | 10/2018 | Johnson et al. | |
| 10,138,378 B2 | 11/2018 | Hoermann et al. | |
| 10,316,262 B2 | 6/2019 | Bromberg et al. | |
| 10,618,026 B2 | 4/2020 | Taylor et al. | |
| 10,954,449 B2 | 3/2021 | Cohn et al. | |
| 2009/0062591 A1 * | 3/2009 | Bingue | C01B 17/046 422/198 |
| 2014/0027351 A1 | 1/2014 | Bazer-Bachi et al. | |
| 2014/0145107 A1 | 5/2014 | Bromberg et al. | |
| 2016/0141866 A1 | 5/2016 | Bromberg et al. | |
| 2017/0113980 A1 | 4/2017 | Radaelli et al. | |
| 2017/0260047 A1 | 9/2017 | Said et al. | |

FOREIGN PATENT DOCUMENTS

| | | |
|---|---|---|
| DE | 3609897 A1 | 10/1987 |
| WO | 2020/069146 A1 | 4/2020 |

OTHER PUBLICATIONS

University of Liverpool. "Breakthrough in direct activation of CO2 and CH4 into liquid fuels and chemicals." ScienceDaily. ScienceDaily, Oct. 6, 2017. <www.sciencedaily.com/releases/2017/10/171006124012.htm>.

\* cited by examiner

PROCESS FOR RECOVERING HEAT AT HIGH TEMPERATURES IN PLASMA REFORMING SYSTEMS

FIELD OF INVENTION

The present invention relates generally to high temperature heat recovery, and more particularly, to a system, method, and apparatus for storing, regenerating, recuperating, and transporting heat in reformer systems.

BACKGROUND OF THE INVENTION

Plasma reformer systems, which convert a reactant stream into a product stream having a different composition, produce high levels of enthalpy to drive the reforming process. Producing these high temperatures requires a large amount of energy. While a portion of this energy may be stored in the product stream in the form of products having higher chemical potential energy, much of the energy remains thermal (sensible) energy which can be difficult to recover. The difficulty in recovering the thermal energy from plasma reformer systems stems from two main issues; first, the temperatures produced are often well above 800° C., thus, standard heat exchangers (recuperators) cannot be used as they are unable to withstand such high temperatures. And secondly, the pressure of the product stream is generally relatively low (≤5 bar), thus the product stream itself cannot efficiently drive a turbine for power generation.

SUMMARY OF THE INVENTION

Systems and methods for recovering a larger portion of the thermal energy from the high temperature product stream of plasma reformer systems are presented. The effective implementation of heat recovery will lead to plasma reformer systems that are more efficient, require less electricity and have a higher throughput.

This disclosure focuses on using a plasma reformer to convert mixtures of methane ($CH_4$), carbon dioxide ($CO_2$), and steam ($H_2O$) into synthesis gas (syngas) which is a mixture of hydrogen gas ($H_2$) and carbon monoxide (CO). The systems and methods disclosed can, however, be applied to other thermal reforming processes and used to produce other products.

BRIEF DESCRIPTION OF THE DRAWINGS

To better illustrate the invention and to aid in a more thorough description which provides other advantages and objectives of the invention the following drawings are referenced. It is noted that these embodiments are specific examples of the invention and not to be understood as limiting cases for the scope of this invention. The drawings are as follows.

DETAILED DESCRIPTION OF THE INVENTION

Figure 1:
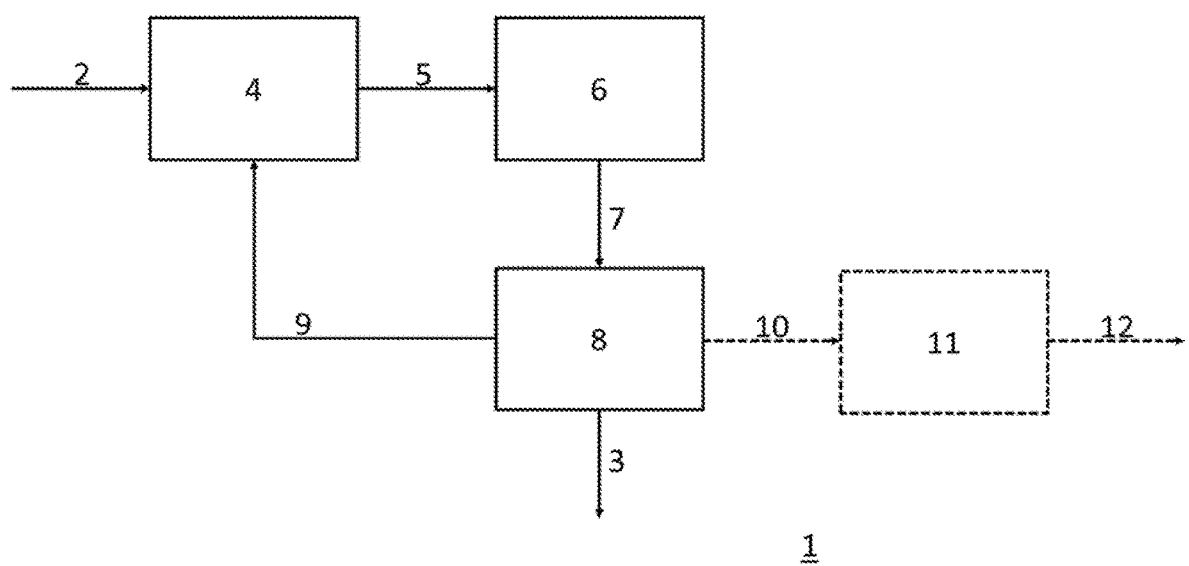
FIG. 1: Block diagram for improved heat recovery in a thermal reformer.

FIG. 1 gives a block diagram for device with improved heat recovery from a heat source 1 used to reform the composition of reactants 2 into products 3. Reactants 2 enter a pre-heater 4 where they are heated to a higher temperature. The pre-heated reactants 5 flow into a unit which provides a heat source 6 which further increases the temperature of the reactants to the point where a portion of the reactants are converted into molecularly different hot products 7. The hot products 7 flows into a heat exchanging unit 8, where the thermal energy 9 in the hot products 7 is removed. This thermal energy 9 is used to pre-heat the reactants in the pre-heater 4, which reduces the energy that must be provided by the heat source 6, thus increasing efficiency and throughput. Optionally, additional thermal energy 10 recovered in the heat exchanging unit 8 may be used in an electricity generator 11 to generate electricity 12. This electricity 12 can be used to partly power the heat source 6, increasing the total energy efficiency of the reformation process. Products 3 at lower temperatures flow out of the heat exchanging unit 8, the temperature of the products 3 at the exit of the heat exchanging 8 unit is adjusted to the requirements downstream.

Embodiment 1

Figure 2:
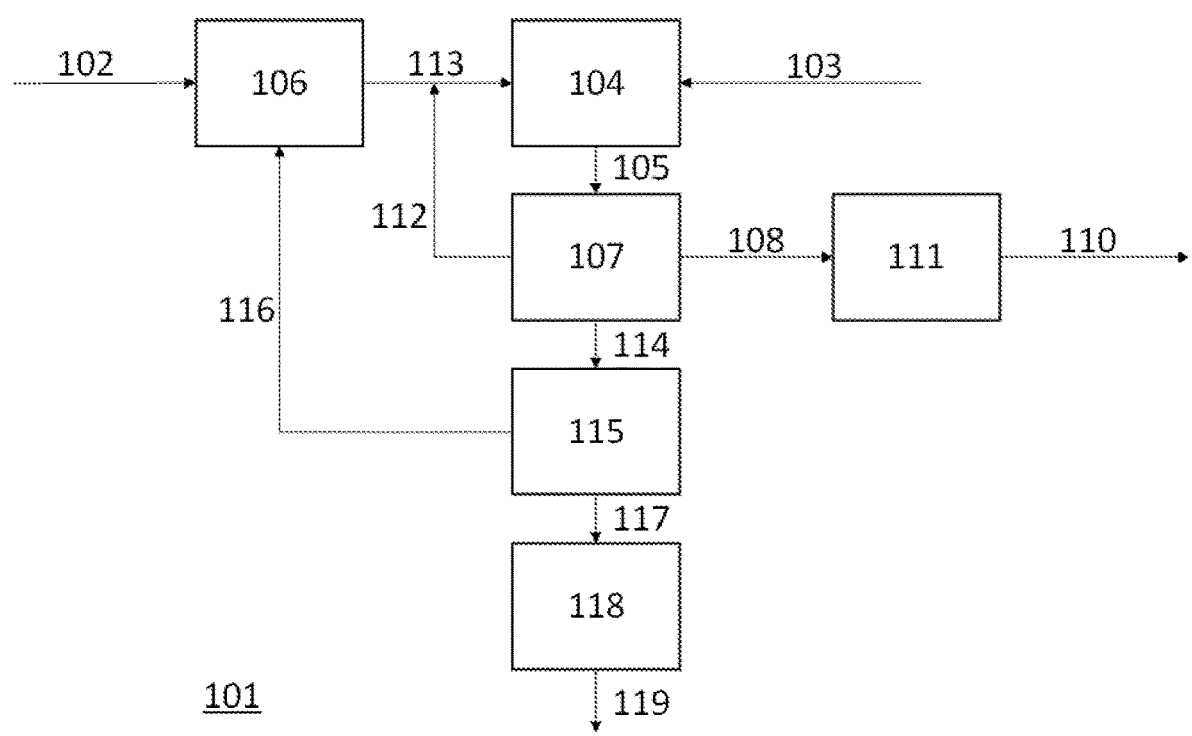
FIG. 2: Block diagram of an improved heat recovery method for a plasma reformer system according to embodiment 1.

To aid in the description of the system and method for improving the heat recovery from a plasma reformer system 101 according to a first embodiment, reference is made to the block diagram in FIG. 2. Reactants 102 and electricity 103 are input to a plasma reformer unit 104 (acting as heat source 6, see FIG. 1), where the electrical energy is converted to thermal energy in the reactant stream, high enough temperatures are reached to reform a fraction of the reactant molecules into other molecules resulting in a hot product stream 105 which leaves the plasma reformer unit 104. Note that in FIG. 2 the input reactants 102 first flow through a pre-heater 106 prior to injection into the plasma reformer unit 104, this portion of the diagram will be discussed later.

In this embodiment, the heat exchanging unit 8 has two portions. A first portion of the heat exchanging unit 8 comprises a high temperature heat exchanger 107 into which the hot product stream 105 flows. In the high temperature heat exchanger 107, the heat (thermal energy) 108 is removed from the hot product stream 105, heating a high-pressure fluid 109 (not shown in FIG. 2) in a secondary loop and converted into electricity 110 via turbine 111. Additionally, if the medium used as high-pressure fluid 109 to remove heat in the secondary loop has the same composition as one of the reactants 102, a portion or all of the medium can be injected as an additional pre-heated reactant stream 112 into the pre-heated reactant stream 113, thus saving energy in the plasma reformer as less energy will be required to heat the reactants to the reforming temperature. A conventionally hot product stream 114 exits the high temperature heat exchanger 107 having a temperature which can be withstood in typical heat exchangers, i.e. less than 800° C. The secondary flow is at high pressure, with substantial temperature gradient through the heat exchanger walls, needed to provide strength needed for the pressure differential.

A second portion of the heat exchanging unit 8 comprises a cascade of heat exchangers 115 into which the conventionally hot product stream 114 flows (<800° C.). In the cascade of heat exchangers 115, additional heat 116 is removed from the conventionally hot product stream 114 and used to pre-heat the reactants 102, where the reactant pre-heater 106 can simply be the cold side of the cascade of heat exchangers 115. Pre-heating the reactants 102 will reduce energy consumption as less energy will be required to heat the reactants to the reformation temperature. An application product stream 117 exits the cascade of heat exchangers 115 having the temperature required for downstream applications, typically less than 500° C. Some of the heat exchangers in the cascade of heat exchangers 115 can be used to heat a coolant that is used in an electricity producing turbine, using either Rankine or Brayton cycles. The secondary loops in the heat exchanger would operate at elevated pressure.

The application product stream 117 which has a temperature required for the downstream processes 118 can then be processed into the final product 119. This stream can then be conditioned (pressure, temperature, and adjustment in composition) prior to being used in downstream reactors, such as those for synthesizing chemicals or fuels.

Example of Embodiment 1

Figure 3:
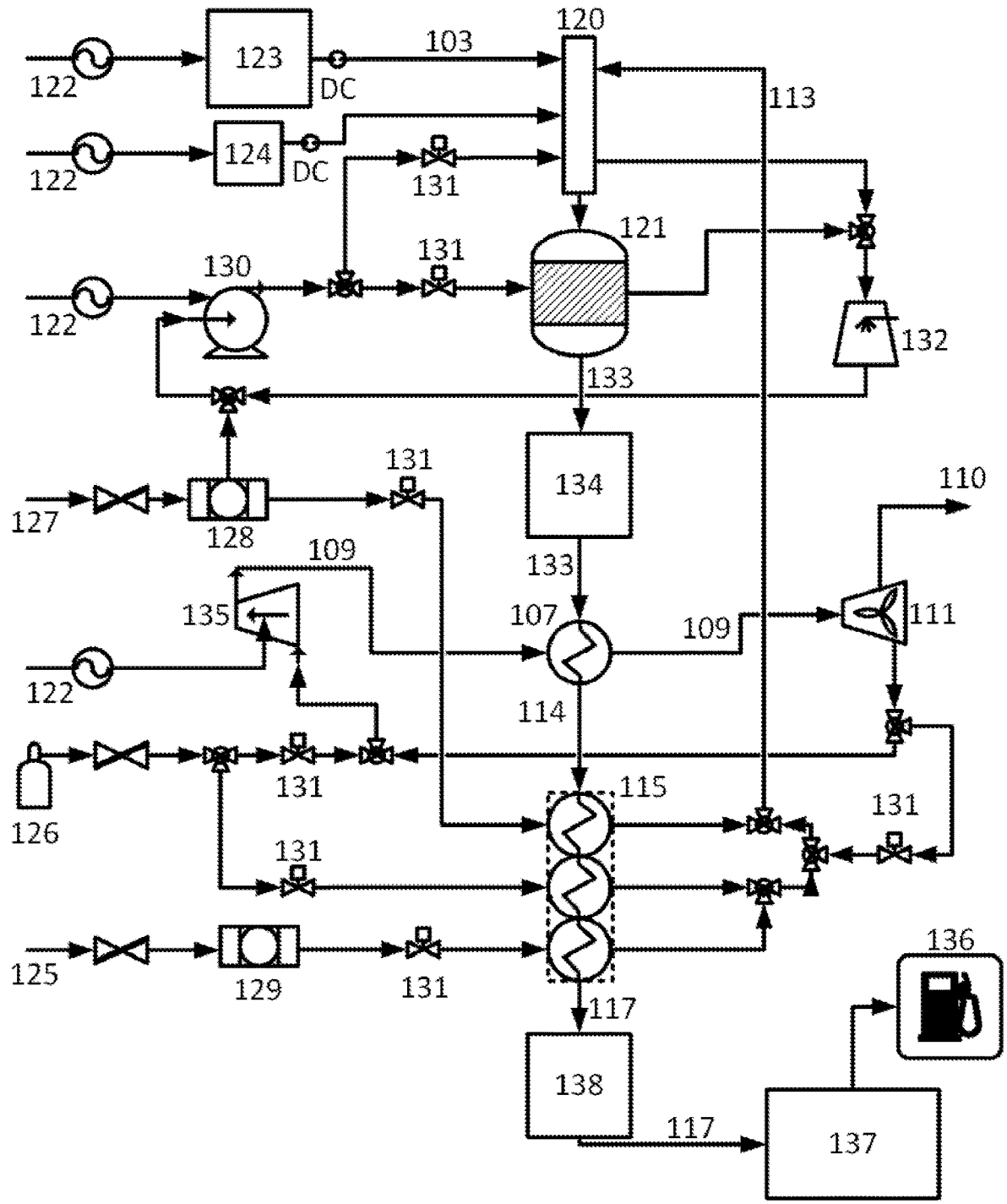
FIG. 3: An example process flow diagram for the production of syngas using a plasma reformer system that includes heat recovery following embodiment 1. Downstream syngas processing to fuel using a Fischer-Tropsch plant is also included.

An example process flow diagram for the production of synthesis gas (syngas, a mixture of hydrogen and carbon monoxide) using a plasma reformer system 101 according to a first embodiment is shown in FIG. 3. In this example, the plasma reformer unit 104 comprises a plasma torch 120 and a product forming vessel 121 (which is optional depending on the reforming product and the required residence time for the product formation). The plasma torch 120 heats the (pre-heated) reactants 113 to approximately 1900° C., using electricity 103 from the AC power grid 122 and converted to DC using a power supply 123. The plasma torch 120 may be ignited using an ignition unit 124 which is also powered by the AC power grid 122. In this example the reactants 102 include natural gas 125 as methane ($CH_4$) source, carbon dioxide ($CO_2$) 126, and water ($H_2O$) 127 in vapor state. As shown in FIG. 3, optionally the water 127 can be purified prior to use using a deionizer 128 and the natural gas 125 can be purified using a gas filter 129. The product forming vessel 121 is a chamber large enough to provide the residence time sufficient for the reactants to reform to the syngas product at 1900° C. As shown in FIG. 3 the walls of the plasma torch and product forming chamber may be water cooled by a water cooling system comprising a water pump 130, flow controllers 131, and a water cooler 132. This is done to extend the life of the hardware. The reactants flow into and out of the plasma reformer system at a pressure of approximately 1 bar.

Hot syngas 133 (~1 bar, 1900° C.) then flows out of the product forming vessel 121, through an optional rough syngas filter 134 which may be used to remove large particles (such as soot), and into the high temperature heat exchanger 107. An example high temperature heat exchanger 107 comprises chambers with walls composed of a high temperature ceramic material that has a large heat capacity. Thus, the walls of the high temperature heat exchanger can absorb and store the large amounts of thermal energy from the incoming syngas. On the exterior of the high temperature ceramic material walls or imbedded within the walls are piping fins containing a heat transfer medium. The heat transfer medium could be composed of pressurized $CO_2$ 109 at 80 bar, for example. As the pressurized $CO_2$ flows through the piping fins of the high temperature heat exchanger 107, it is heated to temperatures of at least 800° C. before flowing to a high temperature turbine 111 where the hot $CO_2$ is allowed to expand generating electricity 110 as the turbines are driven. The $CO_2$ is then compressed again (to 80 bar) using a compressor 135 and cycled back to the high temperature heat exchanger 107, thus completing the closed-loop Brayton cycle. Additionally, in this example since $CO_2$ is both one of the reactants 102 and used as the heat transfer medium in the high temperature heat exchanger, a portion of the heated $CO_2$ can be removed and used as an additional preheated reactant 112 after expansion and prior to recompression. The removed $CO_2$ can then be replaced with cold $CO_2$ from the $CO_2$ source 126. Thus, the high temperature heat exchanger 107 recovers energy by 1) driving turbines for electricity generation, and 2) preheating a portion of the reactants, reducing the energy required for reforming. Additionally, due to the high heat capacity of the high temperature heat exchanger walls, energy can be recovered through electricity generation for a period even after the syngas production has been shut down. The size of the high temperature heat exchanger 107 is adjusted such the conventionally hot product (syngas) 114 exiting has been cooled to a temperature which can be used in conventional heat exchangers 115, about 800° C.

The conventionally hot syngas product 114 (partially cooled to about 800° C.) flows next into a cascade of standard heat exchangers 115 (indicated within a dotted line), such as coil, plate, or tube heat exchangers. This cascade of heat exchangers 115 can be used to heat the reactants individually (as shown in FIG. 3), or the reactants could be mixed prior to pre-heating in the standard heat exchangers. By pre-heating the reactants in the heat exchangers, less energy will be required in the plasma torch 120 to reach the reforming temperature. The number and size of the heat exchanger cascade should be adjusted such that the exiting syngas has a temperature that matches that required for the downstream processes, i.e. an application product stream 117. In this example, the downstream process 118 of producing a fuel 136 from the syngas using a Fischer-Tropsch plant 137 requires a temperature of 200-300° C.

After exiting the cascade of heat exchangers 115, the syngas can optionally be further cleaned 138, depending on composition and downstream requirements. With the syngas composition and temperature now conditioned to the intended application, it is ready for processing into the final product. In this example case, the syngas is used in a Fischer-Tropsch plant 137 to produce fuel 136.

The high temperature heat exchanger 107 will need to be composed of high temperature materials. Materials such as high nickel alloys (Hastelloy or nickel-chromium-aluminum alloys) and ceramics may be used. Non-oxide ceramics have good properties at high temperature under reducing conditions. Specifically, silicon nitrides, silicon carbide, and other ceramics can be used at the high temperatures.

While this example has focused on using a DC plasma torch 120 as the plasma reformer 104 (or heat source 6 more generally), it is worth noting that other plasma generation techniques such as AC plasma, RF plasma, inductively coupled plasma, or microwave plasma techniques are also applicable. Plasmas techniques such as inductively coupled and microwave have the added benefit of not requiring internal electrodes, as such, the need for cooling water for the electrodes can be avoided.

Embodiment 2

Figure 4:
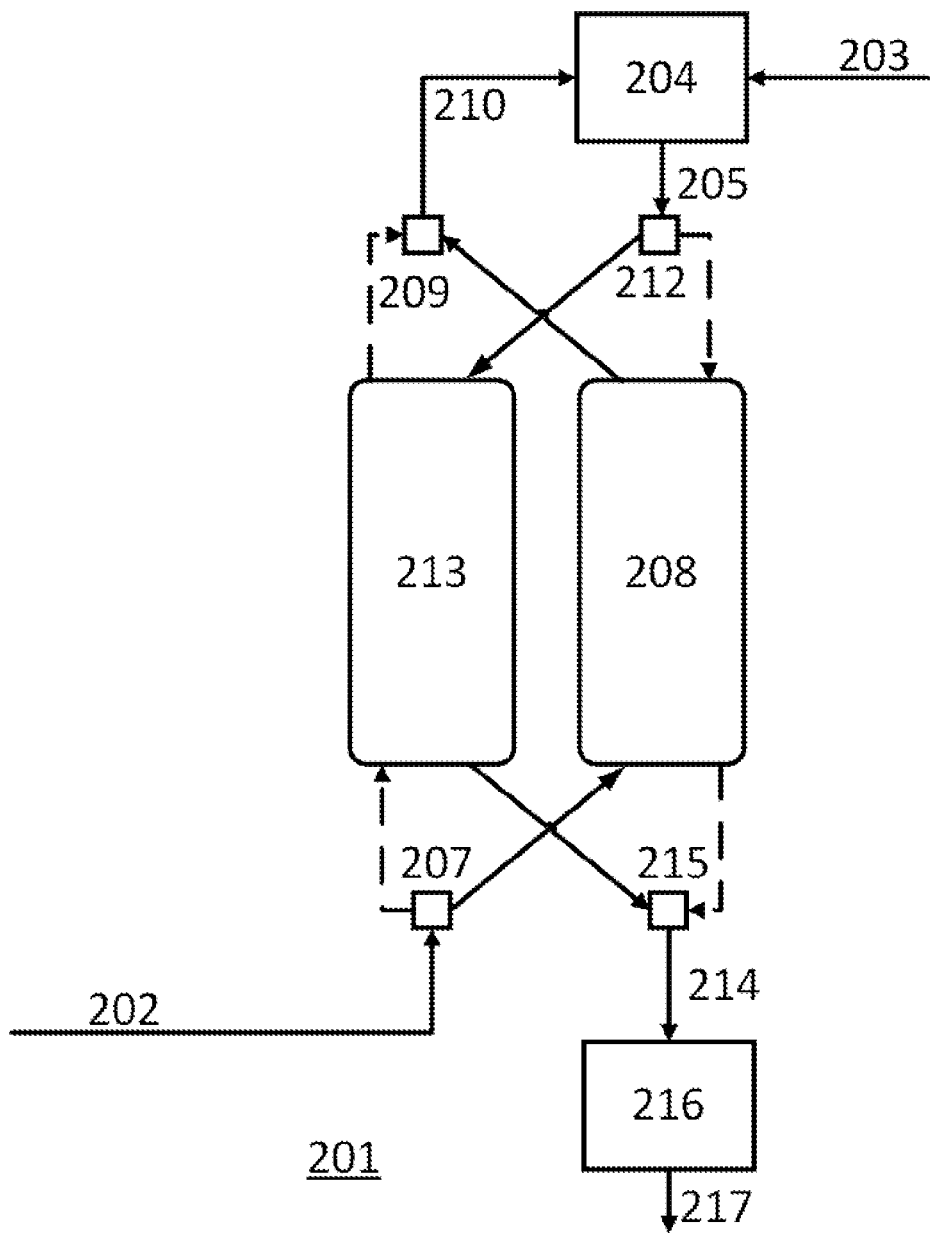
FIG. 4: Block diagram of an improved heat recovery method for a plasma reformer system according to embodiment 2.

To aid in the description of the system and method for improving the heat recovery from a plasma reformer system according to the second embodiment 201, reference is made to the block diagram in FIG. 4. As in embodiment 1, reactants 202 are pre-heated into a pre-heated reactant stream 210, the pre-heated reactant stream 210 and electricity 203 are input to the plasma reformer unit 204, where the electrical energy is converted to thermal energy in the reactant stream. High enough temperatures are reached to reform a fraction of the reactant molecules into other molecules resulting in a hot product stream 205 which leaves the plasma reformer unit 204 at elevated temperature.

In this embodiment, the heat exchanging portion unit 8 comprises two or more fixed-bed heat regenerators, which alternate serving the function of heat recovery/storage and reactant pre-heater 4. The flows in FIG. 4 proceed according to the solid or dashed lines. Reactants 202 flow to a valve A 207 which then directs them to one of the heat regenerators, for the sake of providing a description, the reactants 202 are first injected into a heat regenerator 2 208 (solid lines in FIG. 4). As the reactants flow through heat regenerator 2 208 they are heated from the heat stored in the material within regenerator 2 208. As the reactants 202 reach the top of the heat regenerator 2 208, they reach a maximum temperature which is close to but less than the temperature where the reactants are reformed (within a short period of time). Valve C 209 is set to allow the preheated reactants 210 to flow out of regenerator 2 208 into the plasma reformer 204. In the plasma reformer 204, electricity is used to heat the reactants above the temperature required for reforming and sufficient residence time and energy is provided to drive the reformation. Hot product stream 205 exits the plasma reformer 204 and is diverted by valve D 212 into another heat regenerator, heat regenerator 1 213. As the hot product flows through heat regenerator 1 213, the material within is heated absorbing much of the thermal energy. The size of the heat regenerators are such that at the exit the product stream's temperature has been reduced to the temperature required for downstream processing (typically less than 500° C.), emerging as a application product stream 214. Valve B 215 is set to allow the application product stream 214 to exit the heat regenerator 1 213 and go to the downstream processing unit 216, where a final product 217 is made.

In the above-mentioned configuration, heat will be drained from heat regenerator 2 208 by the reactant stream 202 and heat will build up in heat regenerator 1 213 from the hot product stream 205. Before the regenerator 2 208 reaches a temperature that will reform reactants, valve A 207, valve B 215, valve C 209, and valve D 212 are switched. In this configuration, the reactant stream 202, pre-heated reactant stream 210, hot product stream 205, and application product stream 214 follow the dashed lines relevant to each element in FIG. 4. In this configuration reactants 202 are now preheated in heat regenerator 1 213 and heat is stored in regenerator 2 208.

By temporarily storing the heat in a regenerator 208/213 then imparting the energy to the reactant stream 202, the heat that must be added in the plasma reformer 204 will be greatly reduced, this will lead to reforming systems that have higher energy efficiency. Further, since the pre-heated reactant stream 210 is at a temperature just under that required for reforming, the temperature gradients in the plasma reformer unit 204 will be less which may improve mixing and, as such, decrease the slippage (amount of material that goes through the plasma reformer without being reformed). Additionally, having a very preheated reactant stream can improve the stability of the plasma in the plasma reformer. According to the ideal gas law, for a set pressure increasing the temperature will result in a decrease in the density of the reactant stream. This will help to stabilize the plasma as there is a longer mean free path (due to less collisions) in a lower density gas. This may also be used to establish a difference in temperature between electrons and the gas, thus driving slightly nonthermal conditions.

Example of Embodiment 2

Figure 5:
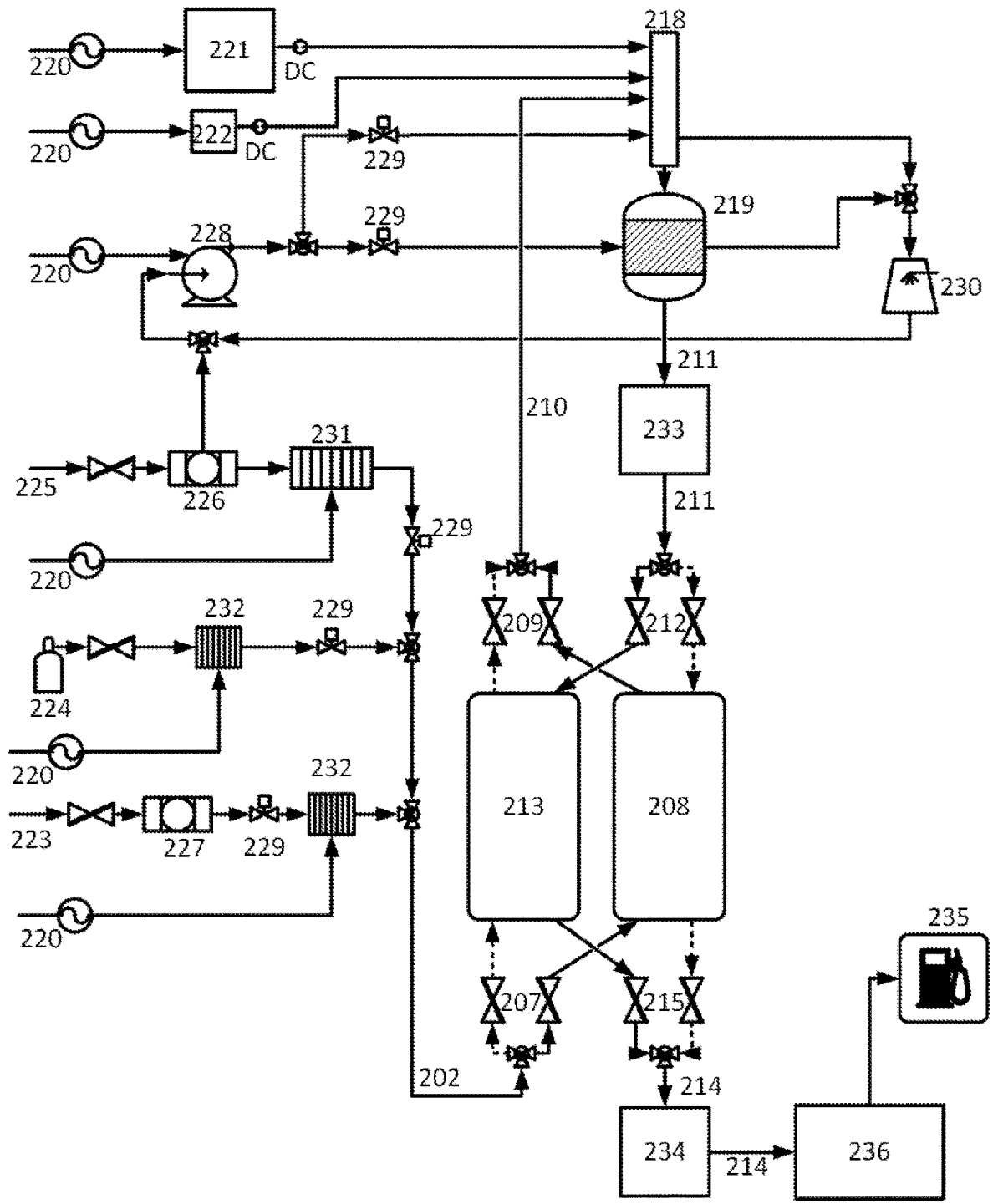
FIG. 5: An example process flow diagram for the production of syngas using a plasma reformer system that includes heat recovery following embodiment 2. Downstream syngas processing to fuel using a Fischer-Tropsch plant is also included.

An example process flow diagram for the production of syngas using a plasma reformer system 201 is shown in FIG. 5. In this example, the plasma reformer unit 204 comprises a plasma torch 218 and product forming vessel 219. The plasma torch 218 heats the pre-heated reactants 210 to approximately 1900° C., using electricity from the AC power grid 220 and converted to DC using a power supply 221. The plasma torch 218 may be ignited using an ignition unit 222 which is also powered by the AC power grid 220. In this example, the reactants 202 include natural gas 223 as methane ($CH_4$) source, carbon dioxide ($CO_2$) 224, and water ($H_2O$) 225 in vapor state, although other reactants or simply dry ($CH_4+CO_2$) or wet ($CH_4+H_2O$) reforming could also be used. In some cases, it may be necessary for the reactants to be purified prior to use as reactants 202 using for example a deionizer 226 and gas filter 227. The product forming vessel 219 is an optional chamber which is large enough to provide the residence time sufficient for the reactants 202 to reform to the syngas product at 1900° C. As shown in FIG. 5 the walls of the plasma torch 218 and product forming vessel 219 may be water cooled, by a water cooling system comprising a water pump 228, flow controllers 229, and a water cooler 230, this is done to extend the life of the hardware. The reactants flow into and out of the plasma reformer system at a pressure of approximately 1 bar.

The preheating of the reactants ($CH_4$, $CO_2$, $H_2O$) is done first using an electric evaporator 231 and heater 232 (as shown in FIG. 5), here the reactants are heated from ~25° C. to ~150° C., where all reactants are gaseous at 1 bar. This initial preheating could also be done using a heat exchanger and a portion of the heat in the syngas output from a regenerator. Further, this initial pre-heating is optional, and may be unnecessary in certain cases such as dry reforming (as no $H_2O$ vapor is present). The gaseous and mixed reactants 202 are initially directed by valve A 207 into heat regenerator 2 208 (see solid line FIG. 5). In heat regenerator 2 208, the reactants 202 are heated from a temperature of ~150° C. to a temperature of ~1500° C. This temperature is close to the reforming temperature. As the now pre-heated reactants 210 leave heat regenerator 2 208 they are directed by valve C 209 into the plasma torch 218, where as previously discussed the additional enthalpy is delivered and reforming occurs.

A hot syngas product stream 211 (~1 bar, ~1900° C.) then flows out of the plasma reformer 204, through an optional rough syngas filter 233 which may be used to remove large particles (such as soot), and into the valve D 212 which directs the hot syngas product stream 211 into heat regenerator 1 213 (see solid line FIG. 5). The hot syngas product stream 211 heats heat regenerator 1 213, and conversely the heat regenerator cools the hot syngas. The heat regenerator's volume is adjusted such that by the time the syngas exits regenerator 1 213 it has been cooled to around 300° C. (the temperature needed for downstream processing).

After exiting heat regenerator 1 213 via valve B 215, the application syngas product stream 214 can optionally be further cleaned 234, depending on composition and downstream requirements. With the syngas composition and temperature now conditioned to the intended application it is ready for processing into the final product of fuel 235. In this example case, the application syngas product stream 214 is used in a Fischer-Tropsch plant 236 to produce fuel 235.

In the above-mentioned configuration, heat will be drained from heat regenerator 2 208 by the reactant stream 202 and heat will build up in heat regenerator 1 213 from the hot product stream 211. Before the regenerator 2 208 reaches a temperature that will reform reactants, valve A 207, valve B 215, valve C 209, and valve D 212 are switched. In this configuration, the reactant stream 202 and hot product stream 211 follow the dashed lines in FIG. 5. Reactants are now pre-heated in heat regenerator 1 213 and heat is stored in regenerator 2 208. During operation the valves are periodically switched in order to efficiently store the heat from the syngas and impart the stored heat to the reactants.

The temperature swing during the flow transients is also determined by the energy flows in the regenerators and the thermal mass of the bed. The temperature swing should be kept to levels where thermal fatigue of the elements of the regenerators does not occur.

Because the pressures on both legs of the system are about the same, even if the high temperature valves A 207, B 215, C 209, and D 212 do not provide a tight seal, there should be limited exchange between the two flows.

Embodiment 3

Figure 6A:
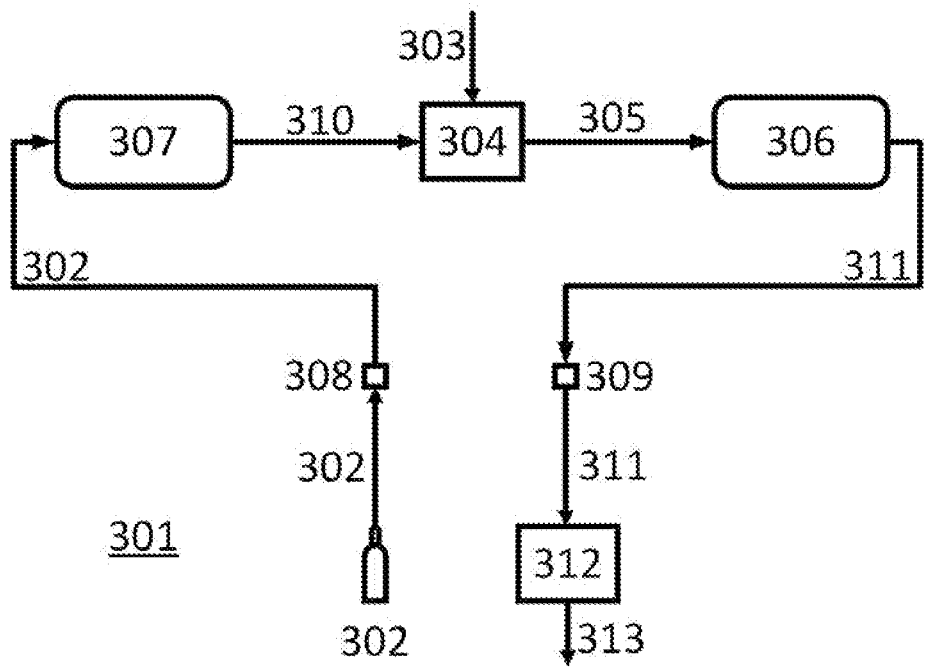
FIGS. 6(a) and 6(b): Block diagram of an improved heat recovery method for a plasma reformer system according to embodiment 3.
Figure 6B:
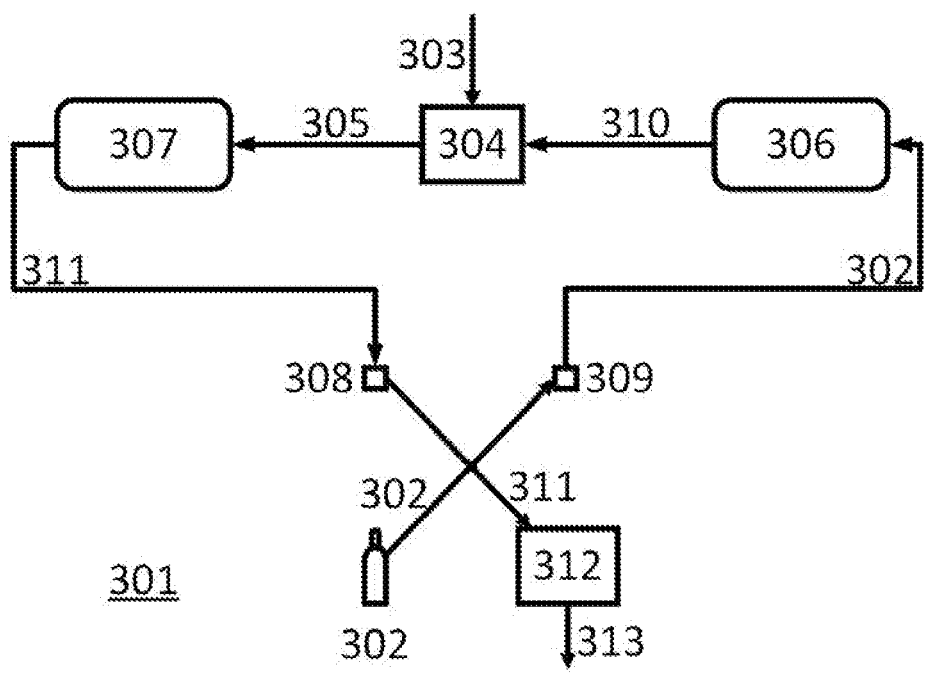

To aid in the description of the system and method for improving the heat recovery from a plasma reformer system according to the third embodiment 301, reference is made to the block diagram in FIGS. 6(a) and 6(b). As in embodiments 1 and 2, reactants 302 and electricity 303 are input to the plasma reformer unit 304, where the electrical energy is converted to thermal energy in the reactant stream, and high enough temperatures are reached to reform a fraction of the reactant molecules into other molecules resulting in a hot product stream 305 which leaves the plasma reformer unit 304 at elevated temperature.

In this embodiment, the pre-heater 4 and the heat exchanging unit portion 8 comprise two fixed-bed heat regenerators 306/307, which, like embodiment 2, alternate serving the function of heat storage and reactant pre-heating. This embodiment, however, avoids the use of high temperature valves (207/209/212/215 in FIGS. 4-5), by reversing the direction of the gas flow through the heat regenerators 306/307 and the plasma reformer unit 304. In this case, only low temperature valves 308/309 need to be switched in order to reverse the flow through the different legs of the system. The avoidance of high temperature valves is a highly attractive feature.

The different flow directions proceed according to FIGS. 6(a) and (b). As shown in FIG. 6(a) following the flow clockwise, low temperature valves A 308 and B 309 are adjusted to allow a reactant stream 302 to flow through low temperature valve A 308 to heat regenerators 2 307. As the reactants flow through heat regenerator 2 307 they are heated from the heat stored in the material within regenerator 2 307. As the reactants reach the end of heat regenerator 2 307, they reach a temperature which is close to but less than the temperature where the reactants are reformed (within a short period of time). This pre-heated reactant stream 310 flow out of regenerator 2 307 into the plasma reformer 304. In the plasma reformer 304, electricity 303 is used to heat the reactants above the temperature required for reforming and sufficient residence time and energy is provided to drive the reformation. The now hot product stream 305 exits the plasma reformer 304 and flows into regenerator 1 306. As the hot product stream 305 flows through heat regenerator 1 306, the material from which the regenerator is composed is heated, absorbing much of the thermal energy in the hot product stream 305. The size of the heat regenerators 306/307 is such that at the exit the product stream's temperature has been reduced to the temperature required for downstream processing (typically less than 500° C.) as an application product stream 311. As the application product stream 311 exits heat regenerator 1 306 the flow is directed by low temperature valve B 309 to further downstream processes 312, where a final product 313 is made.

In the above-mentioned configuration heat will be drained from heat regenerator 2 307 by the reactant stream 302 and heat will build up in heat regenerator 1 306 from the hot product stream 305. Before the regenerator 2 307 reaches a temperature that will reform reactants, low temperature valves A 308 and B 309 are switched, and the counter clockwise path in FIG. 6(b) is followed. In this configuration, low temperature valve B 309 is adjusted such the reactant stream 302 flows through into heat regenerator 1 306 where preheating occurs. The pre-heated reactant stream 310 flows out of the heat regenerator 1 306 and flows into the plasma reformer 304 in the opposite direction as before. The hot product stream 305 now flows out of the plasma reformer 304 and into heat regenerator 2 307 where the heat is stored. Low temperature valve A 308 now directs application temperature product stream 311 to downstream processes 312 where a final product 313 is produced.

By temporarily storing the heat in a regenerator 306/307 then imparting the energy to the reactant stream 302 the heat that must be added in the plasma reformer 304 will be greatly reduced, this will lead to reforming systems that have higher energy efficiency. Further, since the pre-heated reactant stream 310 is at temperatures just under that required for reforming, the temperature gradients in the plasma reformer system will be less which may improve mixing and as such decrease the slippage. Additionally, having a very pre-heated reactant stream 310 can improve the stability of the plasma in the plasma reformer 304. According to the ideal gas law, for a set pressure increasing the temperature will result in a decrease in the density of the reactant stream. This will help to stabilize the plasma as there is a longer mean free path (due to less collisions) in a lower density gas. This may also be used to establish a difference in temperature between electrons and the gas, thus driving slightly nonthermal conditions. Further, by avoiding the use of high temperature valves, less slippage of gases will likely occur within the valves and engineering challenges of constructing and maintaining high temperature moving parts are avoided. In this embodiment the plasma unit must be capable of operating with a reversed flow. Plasmas techniques that do not require internal electrodes such as inductively coupled and microwave plasmas may be especially suited in the configuration of embodiment 3.

Embodiment 4

Figure 7A:
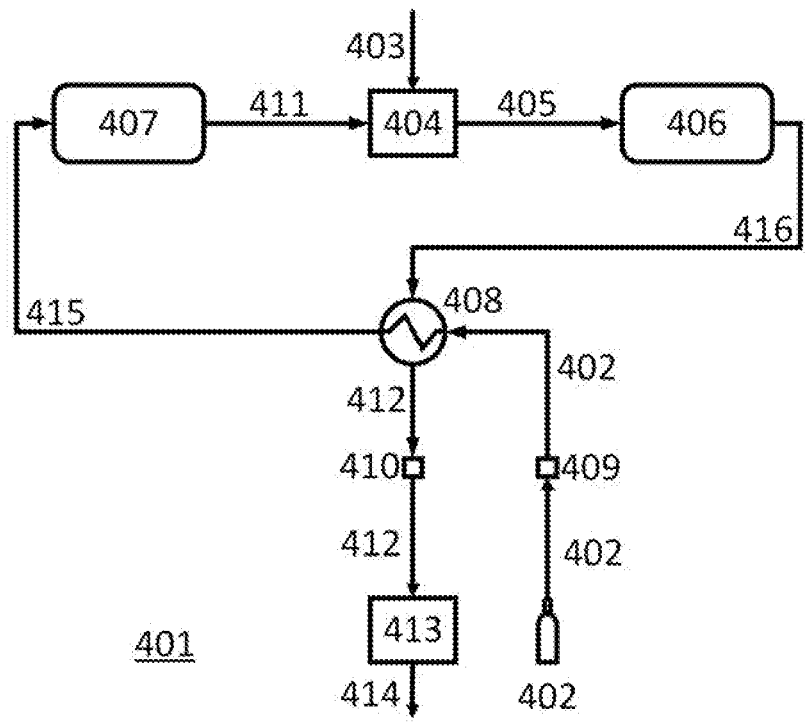
FIGS. 7(a) and 7(b): Block diagram of an improved heat recovery method for a plasma reformer system according to embodiment 4.
Figure 7B:
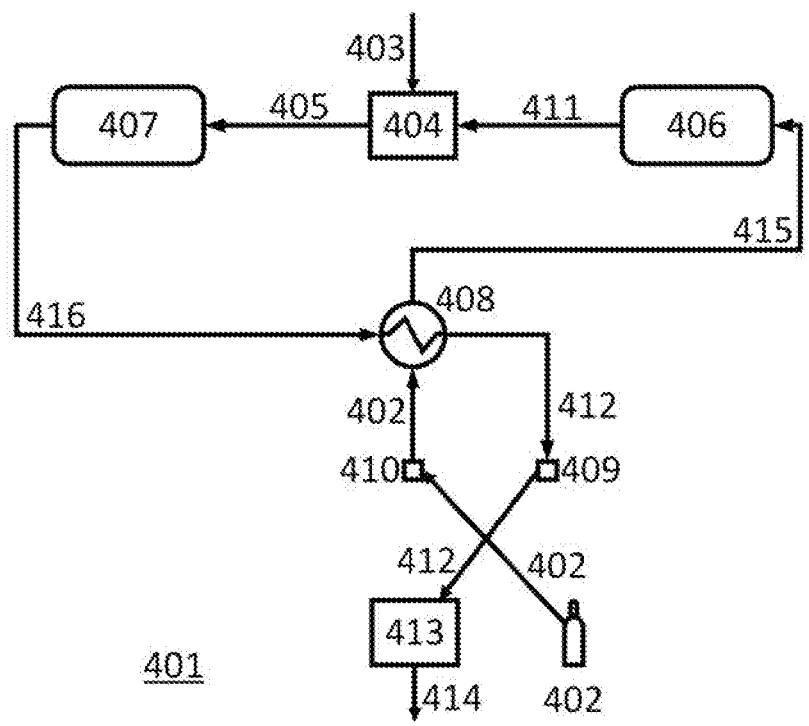

To aid in the description of the system and method for improving the heat recovery from a plasma reformer system according to the fourth embodiment 401, reference is made to the block diagram in FIGS. 7(a) and 7(b). Like the previous embodiments, reactants 402 and electricity 403 are input to the plasma reformer unit 404, where the electrical energy is converted to thermal energy in the reactant stream, high enough temperatures are reached to reform a fraction of the reactant molecules into other molecules resulting in a hot product stream 405 which leaves the plasma reformer unit at elevated temperature.

In this embodiment, the pre-heater 4 and the heat exchanging unit portion 8 comprise two fixed-bed heat regenerators 406/407 and a reversable heat exchanger 408. Similar to embodiment 3, the two regenerators 406/407 alternate serving the function of heat storage and reactant pre-heating. Further like embodiment 3, this embodiment avoids the use of high temperature valves (207/209/212/215 in FIG. 4), by reversing the direction of the gas flow through the heat regenerators 406/407, the reversible heat exchanger 408, the and the plasma reformer 404. In this case, only low temperature valves 409/410 need to be switched in order to reverse the flow through the different legs of the system.

The different flow directions proceed according to FIGS. 7(a) and (b). As shown in FIG. 7(a) following the flow clockwise, low temperature valves A 409 and B 410 are adjusted to allow a reactant stream 402 to flow through low temperature valve A 409 to one side of the reversible heat exchanger 408 where the reactant stream 402 is partly pre-heated exiting the reversible heat exchanger 408 with a temperature of less than 800° C. This partly pre-heated reactant stream 415 then flows to heat regenerator 2 407. As the reactants flow through heat regenerator 2 407 they are heated further from the heat stored in the material within regenerator 2 407. As the reactants reach the end of heat regenerator 2 407, they reach a temperature which is close to but less than the temperature where the reactants are reformed (within a short period of time). This pre-heated reactant 411 stream flow out of regenerator 2 407 into the plasma reformer 404. In the plasma reformer 404, electricity 403 is used to heat the reactants above the temperature required for reforming and sufficient residence time and energy is provided to drive the reformation. The hot product stream 405 exits the plasma reformer 404 and flows into regenerator 1 406. As the hot product 405 flows through heat regenerator 1 406, the material from which the regenerator is composed is heated absorbing much of the thermal energy in the hot product stream 405. The size of the heat regenerators 406/407 are such that at the exit the product stream's temperature has been reduced to a temperature that a conventional heat exchanger can handle (less than 800° C.). The conventional hot product stream 416 flows out of the heat regenerator 1 406 into the other side of the reversible heat exchanger 408, where the temperature of the product stream is further reduced to that required for downstream applications by pre-heating reactants 402. As the application product stream 412 exits the reversible heat exchanger 408 the flow is directed by low temperature valve B 410 to further downstream processes 413, where a final product 414 is made.

In the above-mentioned configuration heat will be drained from heat regenerator 2 407 by the partly pre-heated reactant stream 415 and heat will build up in heat regenerator 1 406 from the hot product stream 405. Before the regenerator 1 406 reaches a temperature that will reform reactants, low temperature valves A 409 and B 410 are switched, and the counter clockwise path in FIG. 7(b) is followed. In the configuration of FIG. 7(b), low temperature valve B 410 is adjusted such the reactant stream 402 flows through into the reversible heat exchanger 408. Notice that the direction through the reversible heat exchanger 408 is switched, as such the hot and cold sides of the heat exchanger will also be switched. A partly pre-heated reactant stream 415 exits the reversible heat exchanger 408 and flows into heat regenerator 1 406 where the reactants are further pre-heated. The pre-heated reactant stream 411 flows out of the heat regenerator 1 406 and flows into the plasma reformer 404 in the opposite direction as before. The hot product stream 405 now flows out of the plasma reformer 404 and into heat regenerator 2 407 where the heat is stored. The size of the heat regenerators 406/407 are such that at the exit the product stream's temperature has been reduced to a temperature that a conventional heat exchanger such as the reversible heat exchanger 408 can handle (less than 800° C.). The conventional hot product stream 416 flows out of the heat regenerator 2 407 into the reversible heat exchanger 408, where the temperature of the product stream is further reduced to that required for downstream applications by preheating reactants. As the application product stream 412 exits the reversible heat exchanger 408, the flow is directed by low temperature valve A 410 to further downstream processes 413, where a final product 414 is made.

By temporarily storing the heat in a regenerator then imparting the energy to the reactant stream the heat that must be added in the plasma reformer 404 will be greatly reduced, this will lead to reforming systems that have higher energy efficiency. Employing a reversible heat exchanger 408 to handle conventional hot product streams 416 allows the use of state-of-the-art technology in the temperature ranges they have been designed to operate. It is worth noting that most conventional heat exchangers can be operated with a reverse flow. Further, since the pre-heated reactant stream 411 is at temperatures just under that required for reforming the temperature gradients in the plasma reformer 404 will be less which may improve mixing and as such decrease the slippage. Additionally, having a very pre-heated reactant stream 411 can improve the stability of the plasma in the plasma reformer 404. According to the ideal gas law, for a set pressure increasing the temperature will result in a decrease in the density of the reactant stream. This will help to stabilize the plasma as there is a longer mean free path (due to less collisions) in a lower density gas. This may also be used to establish a difference in temperature between electrons and the gas, thus driving slightly nonthermal conditions. Like embodiment 3, by avoiding the use of high temperature valves, less slippage of gases will likely occur within the valves and engineering challenges of constructing and maintaining high temperature moving parts are avoided. Further, like embodiment 3 in this embodiment the plasma reformer unit 404 must be capable of operating with a reversed flow. Plasmas techniques that do not require internal electrodes such as inductively coupled and microwave plasmas may be especially suited.

Inclusion of a Slip Stream:

For each of the previous embodiments 101/201/301/401, a slip stream may be included between regions downstream of the heat source 6 to regions upstream of the heat source 6. The hot slip stream can be used to condition the incoming reactants or be reinjected into the heat source 6 in a different configuration. For example, syngas dilution of the reagents (which may include $CH_4$) may decrease the propensity of the reagents to coke the regenerator 208/213/306/307/406/407 or the heat exchangers 107/115/408 in the embodiments. The hot slip stream reinjected into the heat source 6 may have a different injection configuration than that of the pre-heated reactants 5, for example the hot slip stream may be injected as a sheath gas along the walls of a plasma reformer 104/204/304/404 (when a plasma is used as heat source 6) this may reduce the contact reactants have with walls of a plasma reactor which may be at a cooler temperature, thus decreasing the amount of reactants that pass through the plasma without reforming.

Figure 8:
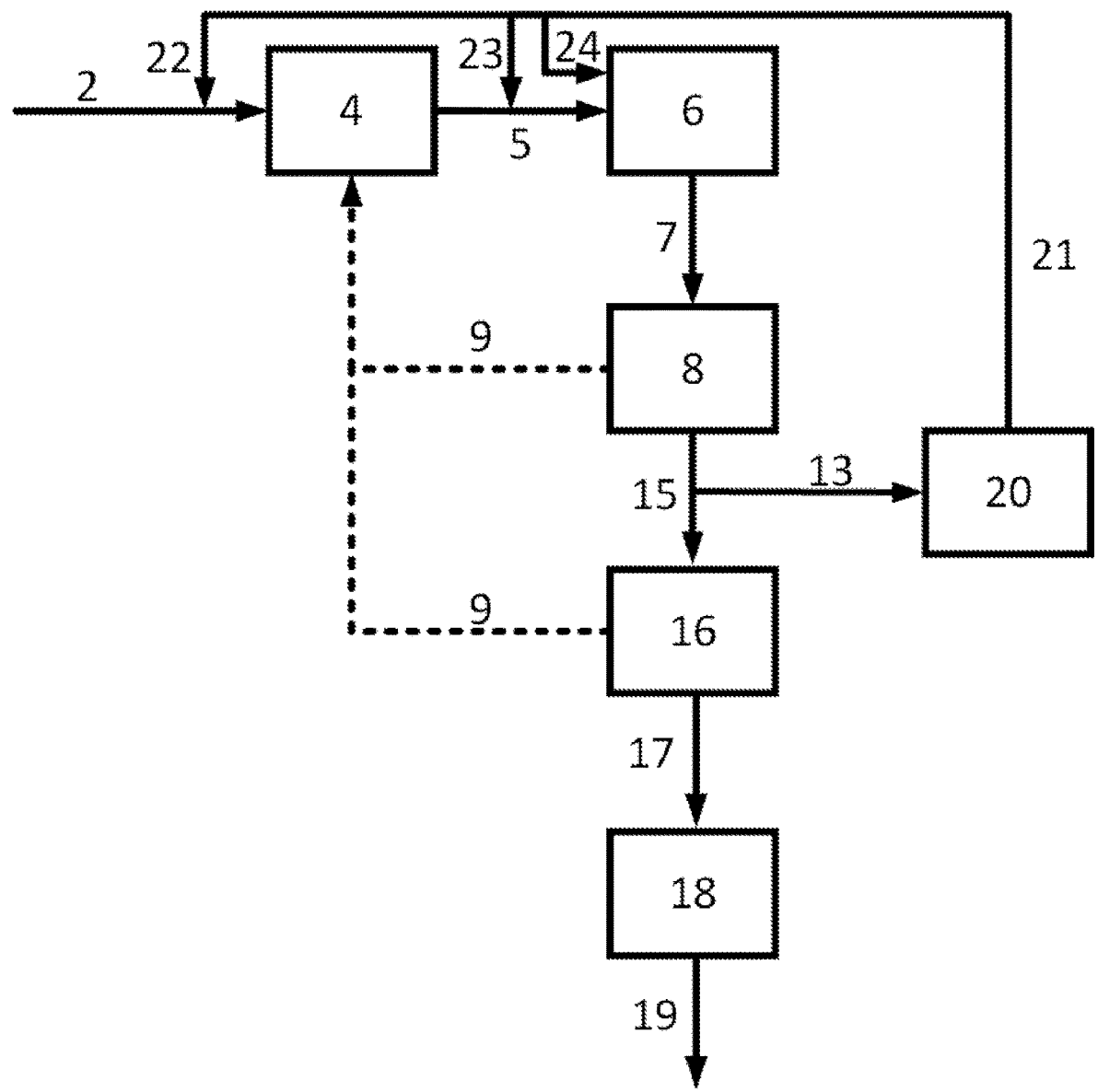
FIG. 8: Recycling of a fraction of the gases exiting the high temperature heat exchanger or heat regenerator via a slip stream.

Any of the previously described embodiments may be enhanced by including a slip stream of conventionally hot product 13 (less than 800° C.). FIG. 8 displays a block diagram of a reformer with enhanced heat recovery that additionally includes a slip stream of conventional temperature product 13 (less than 800° C.) which is pressurized and reinjected upstream or directly into the heat source 6. A reactant stream 2 is fed into a pre-heater 4 where the reactants are heated with recovered heat (thermal energy) 9. The pre-heated reactant stream 5 flow out of the pre-heater 4 into the heat source 6, specifically a plasma reformer of any of the previous embodiments, where molecular reformation occurs. The hot product stream 7 (generally greater than 1000° C.) flows out of the heat source 6 into a heat exchanging unit 8, specifically a high temperature heat exchanger 107 (embodiment 1) or a heat regenerator 406/407 (embodiment 4), where the temperature is reduced to that of a conventional hot product stream 15. For embodiments 1 and 4 a portion of the conventional hot product stream 15 (less than 800° C.) continues to a conventional heat exchanger 16 (such as 115/408). Another portion of the conventional hot product stream 15 is removed via a slip stream 13. An application temperature product stream 17 emerges from the conventional heat exchanger 16 and proceeds to downstream processes 18 to make the final product 19. The portion of the conventional hot product 15 diverted via the slip stream 13 is pressurized (enough to drive the flow, i.e. to a pressure at least equal to that of the reactant stream in) using a compressor 20. The pressurized conventional product slip stream 21 is then injected upstream of the heat source 6 or directly into the heat source 6. Specifically, as shown in FIG. 8, the pressurized conventional product slip stream 21 is injected into the reactant stream prior to the pre-heat 22, injected into the pre-heated reactant stream prior to entering the plasma reformer 23, and/or injected directly into the plasma reformer 24.

Figure 9:
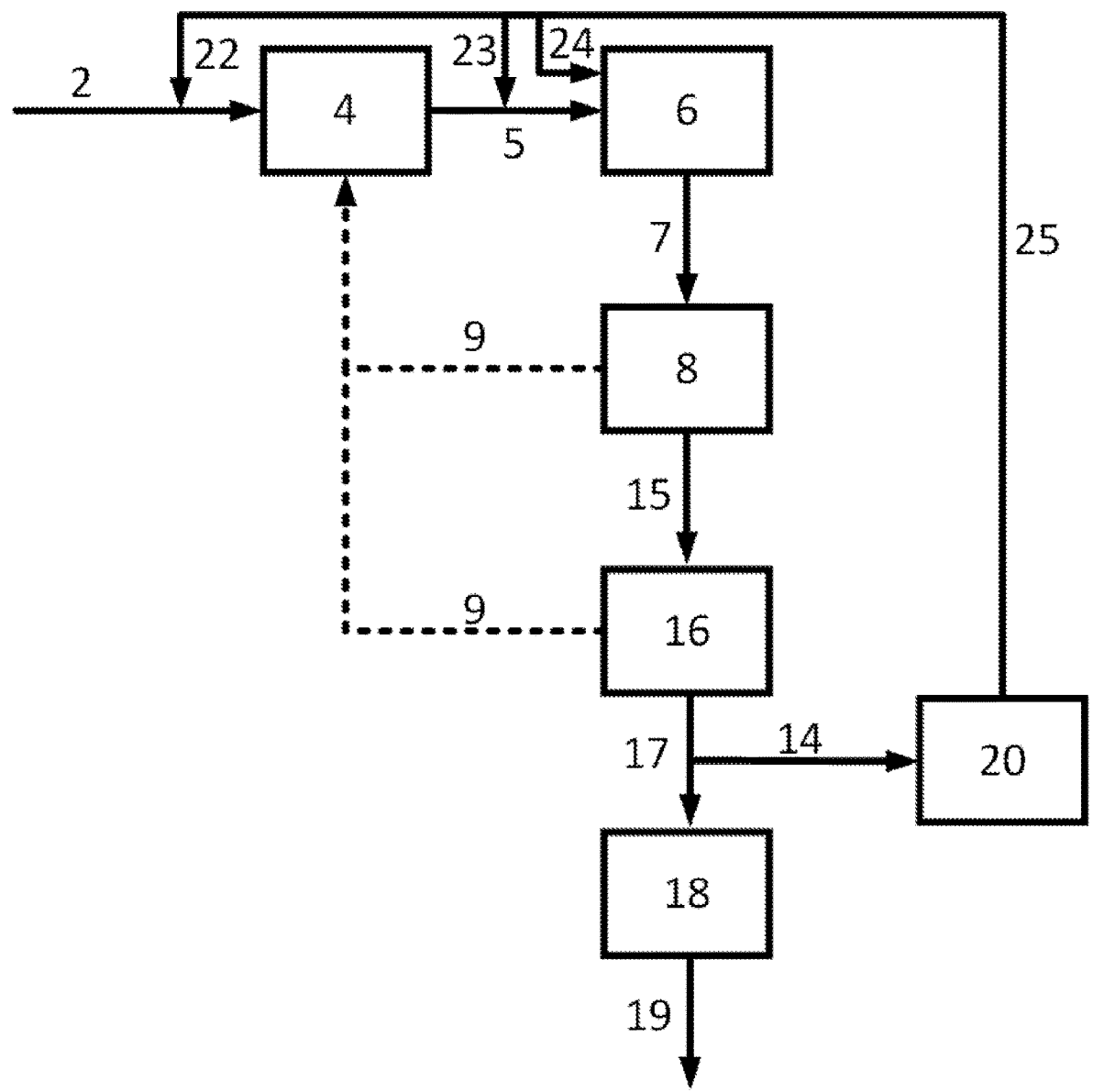
FIG. 9: Recycling of a fraction of the gases exiting the conventional heat exchanger via a slip steam.

Similarly, any of the previously described embodiments may be enhanced by including a slip stream of application temperature product 14. FIG. 9 displays a block diagram of a reformer with enhanced heat recovery that additionally includes a slip stream of application temperature product 14 (less than 300° C.) which is pressurized and reinjected upstream or directly into the heat source 6. A reactant stream 2 is fed into a pre-heater 4 where the reactants are heated with recovered heat (thermal energy) 9. The pre-heated reactant stream 5 flow out of the pre-heater 4 into the heat source 6, specifically a plasma reformer of any of the previous embodiments where molecular reformation occurs. The hot product stream 7 (generally greater than 1000° C.) flows out of the heat source 6 into a heat exchanging unit 8, specifically a high temperature heat exchanger 107 (embodiment 1) or a heat regenerator 208/213/306/307/406/407 (embodiments 2-4). For embodiments 1 and 4 the conventional hot product stream (less than 800° C.) continues to a conventional heat exchanger 16 (elements 115 and 408 in embodiments 1 and 4, respectively). For embodiments 2 and 3 the gas continues through a lower temperature region of a heat regenerator 208/213/306/307. An application temperature product stream 17 (generally less then 300° C.) exits the conventional heat exchangers 16. A portion of the application temperature product stream 17 continues to downstream processes 18 to make the final product 19. Another portion of the application temperature product stream 17 is removed through a slip stream 14. The portion of application temperature product 17 diverted via the slip stream 14 is pressurized (enough to drive the flow, i.e. to a pressure at least equal to that of the reactant stream in) using a compressor 20. The pressurized application temperature product slip stream 25 is then injected upstream of the heat source 6 or directly into the heat source 6. Specifically, as shown in FIG. 9, the pressurized product slip stream 25 is injected into the reactant stream prior to the pre-heat 22, injected into the pre-heated reactant stream prior to entering the plasma reformer 23, and/or injected directly into the heat source 24.

Figure 10:
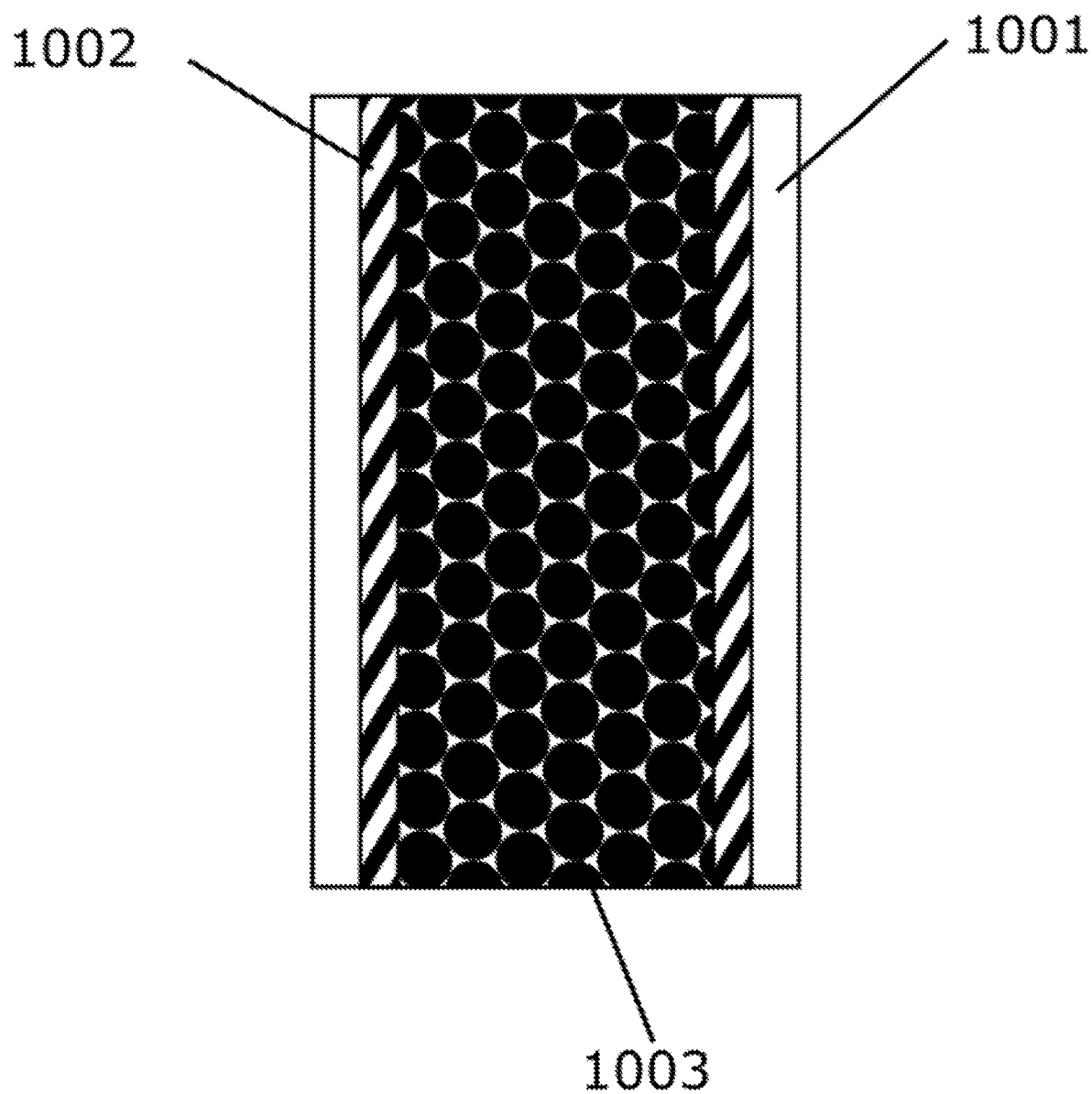
FIG. 10: First example construction of a regenerator.

Regenerator Construction, Operation, and Maintenance:

A first example cross-section of the regenerators that are used in embodiments 2-4 is shown in FIG. 10. An outer metal tube 1001 is lined with ceramic bricks 1002 which are preferably non-oxide ceramics and may be coated with a refractory metal. The center is filled with a porous material 1003 which is capable of quickly changing temperature, thus storing heat when the hot product stream is passed through and giving up heat when the reactants are passed through.

Catalysts which encourage the desired reformation reactions can be included in the regenerators to encourage additional product formation while energy is recovered, i.e. making up a portion of the porous center of the regenerator. By including catalysts it may be possible to drive reactions to completion, by driving reformation chemistry at lower temperatures deep in the regenerators. In this manner, it may be possible to prevent slip, and increase conversion. In syngas production for example catalysts include, nickel, iron, and/or copper. The porous material could be spherical, honeycomb, porous pellets, or a variety of other shapes which would allow gases to flow through. Other materials or surfaces could also be used.

The time in between alternating the direction of flow is determined by the energy flow rates and the thermal mass of the regenerators. The higher the flow rates, the shorter time between reversing the flows. Also, the higher the thermal mass of the regenerators, the longer the time is between flow reversal.

Ideally, the heat diffusion time constant of the heat into the elements that make up the regenerators should be shorter than the time between flow reversal. The heat diffusion time is determined by the thermal conductivity of the material and the size of the elements. Under these conditions, the temperature through the element is constant, although there is a substantial temperature gradient axially along the regenerator.

The performance of the regenerator system is relatively independent of flow rate, although as previously mentioned the frequency of flow reversal would vary with varying flow rate.

At start up, the temperature of the unit is constant along the axis. A temperature gradient along the axis is established slowly, with flow reversal, until the desired temperature profiles along the regenerators are achieved.

Rapid switching of direction through the regenerators is undesirable as it will likely lead to an increase in reactant slippage. To further reduce the frequency of flow reversal it is possible to construct a regenerator with a very high heat capacity. One way to provide such material is through the use of phase-change material. For example, the porous material bed 1003 may be made from layered objects, such as sphere of one material within a larger sphere. The outer layer of the sphere has a high melting temperature, while the inside is filled with a material that, at the desired temperature, melts. The heat of fusion of the phase-change material can be used to provide a large amount of heat at a constant temperature. It may be possible to have multiple regions in the regenerator, with materials that experience phase change at different temperature, i.e. tuned to optimize various sections of the regenerator along the temperature gradient.

Figure 11:
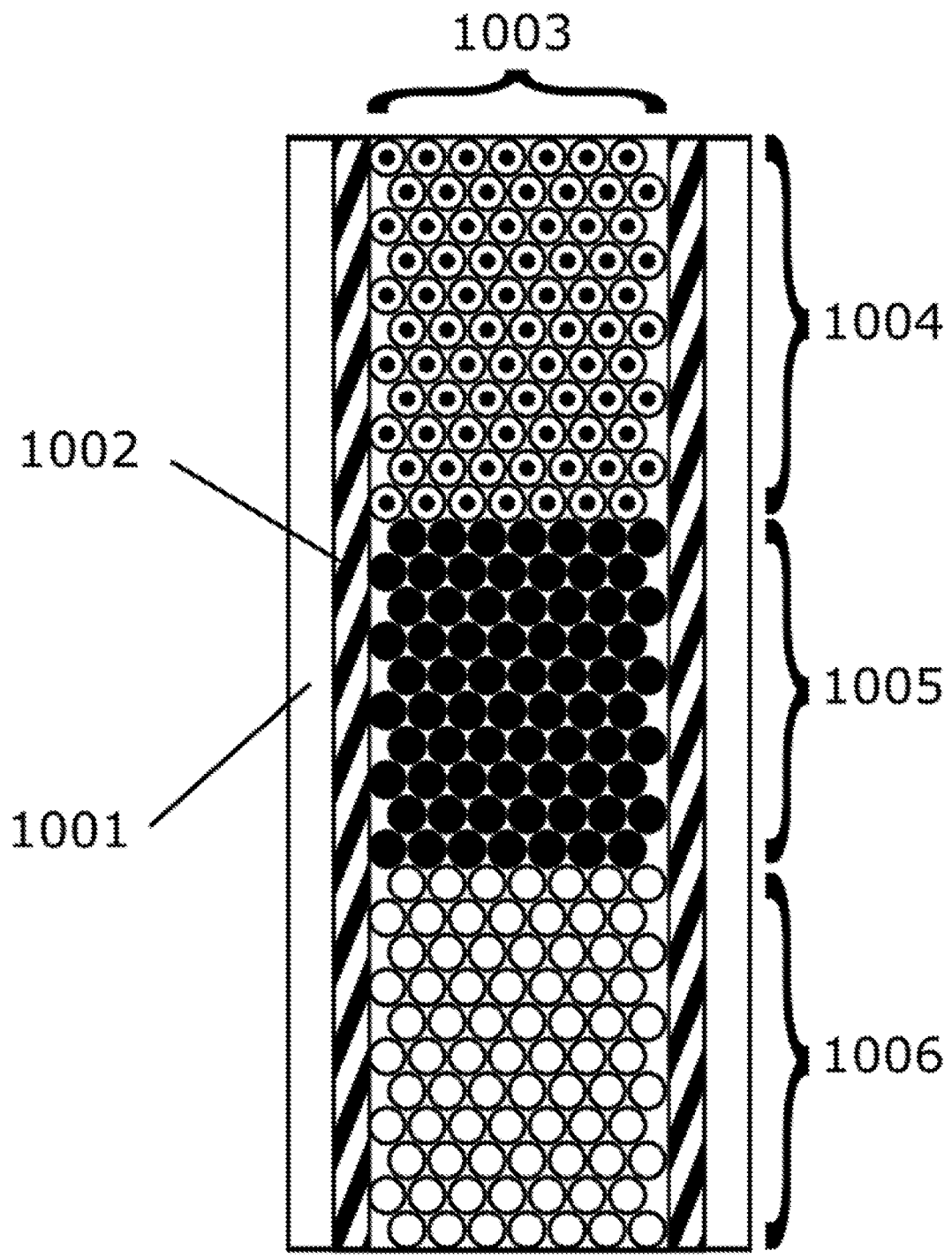
FIG. 11: Second example construction of a regenerator.

A second example cross-section of the regenerators used in embodiments 2-4 is shown in FIG. 11. Similar to FIG. 10 an outer metal tube 1001 is lined with ceramic bricks 1002 which are preferably non-oxide ceramics and may be coated with a refractory metal. The center is filled with a porous material 1003 which is capable of quickly changing temperature, thus storing heat when the hot product stream is passed through and giving up heat when the reactants are passed through. To optimize heat recovery the porous center is divided into three different porous regions, porous region 1 1004, porous region 2 1005, and porous region 3 1006. The porous materials in each of the regions is optimized to storing and releasing thermal energy for the specific temperature range expected in the different regions.

Finally, in regard to the maintenance of the porous material 1003 in the regenerators, when there is adverse chemistry in that slowly deposits material within the regenerator, such as coking, it would be possible to change the nature of the reactants. For example, it may be possible to add a compound to address undesirable deposits on the surfaces of the regenerators and the heat exchangers 107/115/408 (i.e. also embodiment 1). Thus, it may be possible to periodically regenerate the unit. The additional reagent could be oxygen, steam, or a compound that will react with the deposits and remove them. Similarly, for embodiments 2-4 a third regenerator could be included where the three regenerators fulfill the roles of pre-heater, heat exchanging, and cleaning. The cleaning of the third regenerator could be done chemically as previously mentioned or physically. Including a third regenerator may reduce downtime due to a clogged regenerator.

We claim:

1. A thermal reformer with heat recovery for the conversion of one or more reactants into products, comprising:
    a first fixed-bed regenerator;
    a heat source fluidly connected to the first fixed-bed regenerator;
    a second fixed-bed regenerator fluidly connected to the heat source;
    a heat exchanger fluidly connected to the first fixed-bed regenerator and the second fixed-bed regenerator, the heat exchanger having a cold side and a hot side; and
    a valve system controlling a fluid flow direction through the first fixed-bed regenerator, the heat source, the second fixed-bed regenerator, the cold side of the heat exchanger, and the hot side of the heat exchanger, wherein the valve system comprises a first valve and a second valve;
    wherein the cold side of the heat exchanger is fluidly connectable to one of the first fixed-bed regenerator and the second fixed-bed regenerator, and the hot side of the heat exchanger is fluidly connectable to the other of the first fixed-bed regenerator and the second fixed-bed regenerator, and wherein the cold side and the hot side are reversible by switching the fluid flow direction using the first valve and the second valve;
    wherein the first valve and the second valve of the valve system are configured to periodically switch the fluid flow direction between,
        a first fluid flow direction wherein a fluid comprising said one or more reactants flows through the cold side of the heat exchanger to partly preheat the one or more reactants, then flows through the first fixed-bed regenerator to further preheat the one or more reactants using heat stored in the first fixed-bed regenerator, and then flows through said heat source to reform a portion of the one or more reactants into products, after which said products flow through said second fixed-bed regenerator to remove a portion of the heat from the products by absorbing the heat in the second fixed-bed regenerator, and then flow through the hot side of the heat exchanger to remove a further portion of the heat from the products, and
        a second fluid flow direction wherein a fluid comprising said one or more reactants flows through the cold side of the heat exchanger to partly preheat the one or more reactants, then flows through said second fixed-bed regenerator to further preheat the one or more reactants using heat stored in the second fixed-bed regenerator, and then flows through said heat source to reform a portion of the one or more reactants into products, after which said products flow through said first fixed-bed regenerator to remove a portion of the heat from the products by absorbing the heat in the first fixed-bed regenerator, and then flow through the hot side of the heat exchanger to remove a further portion of the heat from the products;
    wherein the heat source is configured to heat said one or more reactants to a temperature where the portion of the one or more reactants is reformed into products having a molecular composition different from that of the one or more reactants.

2. The thermal reformer of claim 1, wherein the first fixed-bed regenerator and the second fixed-bed regenerator are each comprised of at least a metal tube, a ceramic, and a porous center.

3. The thermal reformer of claim 2, wherein said one or more reactants include at least $CH_4$ and $CO_2$, and said porous center contains a catalyst which encourages the formation of $H_2$ and CO via a reforming reaction of $CH_4$ and $CO_2$.

4. The thermal reformer of claim 2, wherein said porous center contains a phase changing material encapsulated within an encapsulation material;
    wherein the melting temperature of said phase changing material is less than that of said encapsulation material.

5. The thermal reformer of claim 2, wherein the composition of said porous center varies axially along at least one of the first fixed-bed regenerator and the second fixed-bed regenerator.

6. The thermal reformer of claim 1, further comprising a third fixed-bed regenerator fluidly connected to the heat source and the heat exchanger, wherein the valve system is further configured to direct the fluid to flow through two of the three fixed-bed regenerators while the remaining fixed-bed regenerator is chemically or physically cleaned.

7. The thermal reformer of claim 1, further comprising a slip stream configured to remove a portion of said products and reinject the portion of said products into the one or more reactants, the first fixed-bed regenerator, the second fixed-bed regenerator, or the heat source.

8. The thermal reformer of claim 1, wherein the heat source is a DC plasma torch, AC plasma, RF plasma, inductively coupled plasma, or microwave plasma.

9. The thermal reformer of claim 1, wherein the first valve and the second valve are configured to switch the fluid flow direction such that a swing in temperature of the first fixed-bed regenerator and the second fixed-bed regenerator is kept to a predetermined level where thermal fatigue of the first fixed-bed regenerator and second fixed-bed regenerator does not occur.

10. The thermal reformer of claim 1, wherein the first valve and the second valve are configured to switch the fluid flow direction such that the time between switching the fluid flow direction is longer than the time required to heat the first fixed-bed regenerator and the second fixed-bed regenerator to a constant temperature.

* * * * *